United States Patent [19]

Krouse

[11] Patent Number: 5,705,558
[45] Date of Patent: Jan. 6, 1998

[54] WATER-BASED REFLOW COATING COMPOSITION

[75] Inventor: James N. Krouse, Richmond, Ind.

[73] Assignee: C.P., Inc., Connersville, Ind.

[21] Appl. No.: 114,736

[22] Filed: Aug. 30, 1993

[51] Int. Cl.$^6$ .................................................. C08L 51/28
[52] U.S. Cl. ..................... 524/523; 524/512; 524/538; 524/539; 525/119; 525/163; 525/221; 525/228
[58] Field of Search ........................... 524/523, 538, 524/539, 512; 525/119, 163, 221, 228

[56] References Cited

U.S. PATENT DOCUMENTS

| | | | |
|---|---|---|---|
| 4,425,466 | 1/1984 | Santer et al. | 524/512 |
| 4,460,742 | 7/1984 | Kishida et al. | 525/64 |
| 4,900,774 | 2/1990 | Mitsuji et al. | 524/512 |
| 5,138,055 | 8/1992 | Parekh | 544/196 |
| 5,166,254 | 11/1992 | Nickle et al. | 524/512 |
| 5,262,482 | 11/1993 | Smith et al. | 525/176 |

OTHER PUBLICATIONS

"Bake–Sand–Bake", J. Oliver, *Products Finishing*, Oct. 1969, pp.42–47.
"BF Goodrich Carboset® Resins", Product Brochure GC–73, (1973), pp. 1–28.
"DuPont Elvacite Acrylic Resins, Properites And Uses", Product Brochure, pp. 21 and22 (before Aug. 1993).
"Union Carbide GlycolEthers, Carbitol, Cellusolve, Propasol, Dipropasol", Product Brochure, pp. 4–5, 14–15, (before Aug. 1993).
"Good Year Chemicals Pliolite Waterborne Resins 7103 & 7104; Formulating Guidelines For Paints And Coatings", Product Brochure, Mar. 1991, pp. 3, 9–10, 15–17.
"Union Carbide SILWET® Surfactants", Product Brochure, pp. 1–3, 8–9 (before Aug. 1993).
"Use of EASTMAN® Cellulose Acetate Butyrate In Thermally Reflowable Coatings", Eastman Chemical Product Brochure, Fomulator's Notes, No. E–3.3 1A, Jul. 1978, pp. 1–6.

*Primary Examiner*—Vasu Jagannathan
*Assistant Examiner*—John J. Guarriello
*Attorney, Agent, or Firm*—Barnes & Thornburg

[57] ABSTRACT

Water-reducible coating formulations suitable for use in thermal reflow coating protocols are described. The water-based coating formulations comprise an aqueous dispersion based coating formulations composition. The resin solids comprise about 70 to about 99% by weight of an acrylic resin having a glass transition temperature less than 150° F. and an effective amount of a reflow modifier selected from a thermoplastic resin having a glass transition temperature greater than 150° F. or less than 80% of the stoichiometric amount of a cross-linking agent for the acrylic resin. The improved water-based formulations in accordance with the invention provide high gloss, thermally reflowable coatings without the high organic volatiles content of art-recognized thermal reflow coating systems.

2 Claims, No Drawings

WATER-BASED REFLOW COATING COMPOSITION

BACKGROUND AND SUMMARY OF THE INVENTION

The present invention relates to a composition and method for applying high gloss coating compositions. More particularly the invention is directed to water-reducible coating formulations adapted for use in thermal reflow coating protocols.

The so-called "bake-sand-bake" or "thermal reflow" method for applying high gloss, abrasion/chemical resistant coatings has found wide use for automotive and appliance finishing. The method permits inspection of the coated surface, and sanding to remove blemishes after an initial low temperature bake of a topcoat which, during a subsequent, typically higher temperature heating step reflows to provide a high gloss finish. Thermal reflow coating protocols have all but replaced the traditional coating methods where the topcoat was sanded and the rubbed or buffed to provide the desired high gloss surface.

While thermal reflow coating systems have enjoyed wide industrial use, they have not been without disadvantage, particularly with the advent of stricter environmental regulations which have forced manufacturers to find ways to reduce emissions of volatile organic compounds incident to manufacturing operations. Prior to the development work which led to the present invention, all commercially available thermal reflow coating systems were solvent based systems containing about 30 to about 80% volatile organic compounds. Nonetheless, wide use of such solvent based thermal reflow systems has continued because of the high quality, cost-efficient coatings that can be applied using such systems. Generally it has been thought by skilled practitioners that the multi-functional requirements of thermal reflow systems were such that they could be met only through use of solvent-based coating formulations which provide more flexibility in formulations development work. The design of thermal reflow coating systems which provide the necessary bake-sand-bake typically has proven to be challenging, even with the significant compositional flexibility inherent in solvent based systems. Clearly the formulation of a zero-to-low VOC water-based thermal reflow systems capable of meeting the multifaceted functional requirements of such systems would be considered a significant advance in coating technology.

Thus, in accordance with the present invention, there is provided a method and water-based coating composition for providing a high gloss finish in a thermal reflow or bake-sand-bake coating protocols. The water-based coating formulation of this invention comprises an aqueous dispersion of a resin solids composition having a glass transition temperature of less than 150° F. and an effective amount of a reflow modifier. The reflow modifier component of the present composition can be a thermoplastic resin having a glass transition temperature greater than 150° F. The thermoplastic resin is used in an amount effective to provide resin solids composition with reflow characteristics at temperature of about 250° to about 350° F. following an initial partial curing thermal treatment of about 80° to about 320° F. Alternatively, the reflow modifier used in combination with the acrylic resin component is a cross-linking agent for the acrylic resin. The cross-linking agent is used in an amount not more than about 80%, more preferably less than 50%, of the stoichiometric amount of that cross-linking agent calculated based on the amount of the acrylic resin.

The reflow modifier functions to provide a coating composition that can be dried to form a sandable surface following an initial thermal treatment at about 80° to about 320° F. and thereafter reflowable at temperatures of about 250° to about 350° F. to provide a high gloss finish exhibiting print resistance within a temperature range of about 140° to about 180° F.

The water-based coating compositions in accordance with this invention can be formulated with other functional ingredients commonly utilized in water-based resin coating formulations, including but not limited to, wetting agents, neutralizing agents, dispersing agents, plasticizers, defoamers, preservatives, coalescents and other art-recognized water-based coating excipient/modifiers. The compositions in accordance with this invention offer the highly desirable bake-sand-bake functionality of art-recognized solvent-based reflow coating systems in a zero-to-low VOC form. Thus use of the present water-based thermal reflow systems provides an improved, environmentally sound means for applying high gloss coatings in a bake-sand-bake coating protocols.

DETAILED DESCRIPTION OF THE INVENTION

The thermal reflow methods for forming high gloss coatings utilizing solvent based film-forming resin compositions is well known in the art. Generally that coating method involves applying a film-forming resin formulation of predetermined composition to a surface, typically over a primer coat. The applied coating is then heated to a first temperature to form a sandable coating which is typically inspected and sanded to remove surface blemishes and thereafter heated to a second higher temperature to thermally reflow the coating thereby forming a high gloss coating finish. The present invention is directed to water-based coating formulations adapted for use in such thermal reflow coating protocols. Use of the present water-based compositions for the preparation of thermal reflow coatings constitute a significant improvement in the art in that they allow for a significant reduction in VOC emissions in commercial coating operations without loss or compromise of art-recognized advantages of thermal reflow coatings.

In accordance with this invention, there is provided a water-reducible film-forming resin formulation comprising an aqueous dispersion of a resin solids composition. The resin solids composition itself comprises about 70 to about 99% by weight of an acrylic resin having a glass transition temperature of about 68° to about 150° F. and an effective amount of a reflow modifier. The reflow modifier component of the present film-forming resin formulation is either a thermoplastic resin having a glass transition temperature of greater than 150° F. or a cross-linking agent for the acrylic resin. When a thermoplastic resin is used as a reflow modifier, it constitutes about 10 to about 30% by weight of the resin solids composition. When a cross-linking agent for the acrylic resin is utilized as the reflow modifier, it forms about 0.1 to about 12% by weight of the resin solids composition provided that the amount of the cross-linking agent utilized as the reflow modifier should not exceed 80% of the stoichiometric amount of said cross-linking agent calculated based on the amount of the acrylic resin component of the resin solids composition. More preferably, the amount of cross-linking agent is about 0.1 to about 50% of the stoichiometric amount based on the acrylic resin component.

The acrylic resin component of the film-forming resin formulation in accordance with this invention is selected from those acrylic resins having a glass transition temperature of about 68° F. to about 150° F. A wide variety of acrylic resins meeting that criterion are well known in the art and commercially available. Preferably the acrylic resin component of the present thermal reflow coating compositions is a thermoplastic, optionally cross-linkable, water-dispersible acrylic resins exhibiting a glass transition temperature within the above-defined range; they include acid functional, epoxy functional, and hydroxy functional water dispersible acrylic resins. One preferred class of thermoplastic acrylic resins for use in formulating the present thermal reflow coating compositions are carboxy functional acrylic resins having a glass transition temperature of about 68° to about 150° F. Numerous carboxy functional acrylics meeting those requirements are known and commercially available in the art and include generally the carboxy-functional resins sold by B. F. Goodrich under the trademark Carboset, the carboxy-functional resins sold by Goodyear under the trademark Pliolite (7103/7104) and the Acrylamac brand carboxy functional acrylic baking resins from McWhorter, Inc. Such carboxy functional resins typically have an acid number from about 25 to about 80 and glass transition temperature ranging from about 68° to about 150° F. They are all either dispersible or soluble in water at a pH of about 6.5 to about 9.0 The acrylic resin component of the present thermal reflow coating compositions typically have a molecular weight in the range of $10^3$–$10^6$.

In one embodiment of this invention the reflow modifier component of the water-based thermal reflow coating formulation of this invention is a thermoplastic resin having a glass transition temperature of greater than 150° F. Preferably the thermal plastic resin has a glass transition temperature of about 150° to about 250° F. The nature of the thermoplastic resin, other than its glass transition temperature and its capacity to be dispersed as a component of the film-forming resin formulation, is not critical. Any of the wide variety of commercially available thermoplastic resins meeting those criteria can be employed. One preferred class of thermoplastic reflow modifiers are water-dispersible acrylic resins having glass transition temperatures greater than 150° F. Again, the nature of the thermoplastic reflow modifier is not critical provided that it have the specified high glass transition temperature so that it can be co-functional with the above-discussed acrylic resin component to provide the requisite printing resistance and reflow characteristics.

The reflow modifier component of the present reflow coating compositions can be a cross-linking agent for the acrylic resin. The nature of functional cross-linking agents used as reflow modifiers in accordance with this invention is dependent on the chemical functionality of the primary acrylic resin component. Thus acid-type or carboxy functional thermoplastic or thermosetting acrylics can be cross-linked with an amino resin such as melamine, or melamine formaldehyde condensation resins or polyfunctional epoxy resins. Epoxy-type thermoplastic acrylics, i.e., those with pendent epoxy groups, can be cured or cross-linked utilizing polybasic acids or amine cross-linkers. Amino resins such as melamine formaldehyde condensation resins can be used as cross-linking hydroxy functional acrylics. The amount of cross-linking agent utilized as a reflow modifier in the present compositions can be varied to target the desired printing resistance/reflow characteristics. Generally the present thermal reflow compositions utilize less than 80% of the stoichiometric amount calculated based on the amount of the acrylic resin component of the film-forming resin composition.

More typically the amount of cross-linking agent is less than 50% of the stoichiometric amount.

The thermal reflow coating compositions of this invention typically are formulated to include additional coating excipients to enhance coating functionality and to adapt coating formulations for unique applications. Such commonly employed coating excipients include surfactants/wetting agents, dispersants, viscosity control agents, defoamers, preservatives, pigments, neutralizing agents, and solvent-coalescents. Although one principal advantage of the water-based thermal reflow coating compositions and methods in accordance with the present invention is their low VOC content, as with other water-based resin compositions, some solvent functionality in the present composition is desirable for promoting coalescence, evaporation of water, and to facilitate coating reflow. It is contemplated that the compositions in accordance with the present invention can be formulated to contain up to about 50% by weight, but more preferably less than 12% by weight, most preferably less than 6% by weight of a suitable solvent/coalescent/reflow excipients. Such excipients include art-recognized glycol ethers, including for example, ethylene glycol monomethyl ether, ethylene glycol monopropyl ether, diethylene glycol monomethyl ether, diethylene glycol monoethyl ether, propylene glycol monomethyl ether, propylene glycol monobutyl ether, and the like. Those and other solvent excipients such as ketones and alcohols are commonly used in water-based coating formulations and find use as well in the present formulations.

The thermal reflow coating formulations in accordance with the present invention are prepared using art-recognized equipment and processing techniques commonly employed for the preparation/manufacture of water-based coating compositions. Typically the resin components are blended into a premixed aqueous dispersion of the ingredient excipients and blended to homogeneity. The viscosity of the present formulations can be adjusted by dilution, by pH adjustment, by addition of coalescents, or by the addition of effective amounts of art-recognized viscosity control agents to achieve coating formulation viscosities which result in applied films of the compositions having a dry film thickness of about 0.5 to about 1.5 mils, more preferably from about 0.7 to about 1.2 mils.

The water-based thermally reflowable coating compositions of the present invention so prepared can then be substituted for art-recognized solvent-based thermal reflow coating compositions in existing manufacturing protocols with minimal protocol modification to provide high gloss thermally reflowable coatings with significantly reduced release of volatile organic compounds during the coating operation.

The composition of the water-based coating formulations in accordance with this invention can be varied to target alternate desired coating performance characteristics. For example, the ratio of the acrylic resin and either the higher $T_g$ thermoplastic component or the cross-linking agent can be varied to obtain the desired blocking/reflow characteristics. Further, such characteristics can be targeted by blending the present resin solids compositions with other modifying additives, including methylcellulose, polyvinylbutyral, rosin esters, dextrine, vegetable gums, polystyrene, polyvinylacetate, and the like.

The present invention may be further understood by reference to the following examples.

EXAMPLE I

A thermal reflow coating in accordance with the present invention was applied as follows: Steel panels were coated with a layer of primer having a dry film thickness ("DFT") of about 0.3 mil to about 1.0 mil. The primer layer was allowed to flash off at room temperature for about 5–10 minutes. The steel panel was then baked at 200°–300° F. for about 10 minutes.

A color coat was then applied to the steel panel to a thickness of approximately 0.4–0.8 mil. The color coat was allowed to flash off for about five minutes at room temperature. The steel panel was then baked for 5–10 minutes at about 250°–300° F.

A thermal reflow composition in accordance with this invention coat was then applied to a thickness of about 0.7 to about 1.2 mil. The coating was allowed to flash off for about 5–25 minutes at room temperature, and the steel panel was then baked at about 225° F. for about 10–15 minutes, cooled to room temperature, and the steel panel was then sanded. Thereafter, the panel was baked again for about 5–15 minutes at 270°–330° F. to reflow the applied coating. The bake-sand-bake sequence provides a high gloss coating free of visible sanding lines. The bake-sand-bake sequence can be repeated if necessary to further improve coating appearance and functionality.

EXAMPLE II

Panels coated in accordance with the present invention were evaluated for resistance to blocking/printing by the following standard test procedure. A test panel with a total of 2–3.1 mil dry coating thickness was baked and reflowed (following the procedure of Example 1) and aged 24 hours. A layer of cheesecloth was placed on the coated surface of the test panel and a 2 lb. weight was placed on the cheesecloth over a 1 sq. in. area of the test panel. The weight, cheesecloth, and coated panel were then placed into an oven for 2 hours at 160° F. After removal from the oven, the weight was removed. When the coated test panel had cooled to a temperature of about 70°–80° F., the cheesecloth was removed from the test panel. The panels were then inspected. Slight cheesecloth imprinting on the coated panel is considered acceptable. Deep cheesecloth imprinting, or actual adherence of the cheesecloth to the coated panel, is unacceptable.

EXAMPLE III

Panels were coated using thermal reflow coating systems in accordance with the present invention. The coating systems were prepared using standard procedures for preparation of water-based resin composition. All reflowed coatings were substantially free of visible sand lines and other surface blemishes, and exhibited resistance to blocking.

Example IIIA.

| Component | Volume | Function |
|---|---|---|
| Carboset XL-11 | 93.30 | low-Tg acrylic |
| Cymel 325 | 1.65 | x-linker |
| Glycol Ether DB | 6.45 | coalescing agent |
| Texanol | 6.49 | anti-blistering |
| Silwet L-722 | 0.25 | mar resistance |

This formulation provides a water-based reflow coating composition including 11.45% by volume VOC content.

Example III B.

| Component | Volume | Function |
|---|---|---|
| Carboset XL-11 | 113.30 | low-Tg acrylic |
| Cymel 325 | 1.07 | x-linker |
| Afflair 153 Flash Pearl | 0.16 | sparkle effect |
| DMEA | 0.68 | |

This formulation provides a water-based coating composition including 0.84% by volume VOC content.

Example III C.

| Component | Volume | Function |
|---|---|---|
| Carboset XL-11 | 113.16 | low-Tg acrylic |
| Cymel 325 | 1.07 | x-linker |
| DMEA | 0.67 | neutralizer |
| Silwet L-722 | 0.60 | mar resistance |

This formulation provides a water-based clear coating composition including 0.84% VOC content.

Example III D.

| Component | Weight | Function |
|---|---|---|
| Carboset XL-11 | 121.66 | low Tg acrylic |
| Joncryl 538 | 30.00 | high Tg acrylic |
| Glycol Ether | 17.12 | coalescing agent |
| Texanol | 4.28 | anti-blistering |
| Water | 26.94 | |

Example III E.

| Component | Weight | Function |
|---|---|---|
| Carboset XL-11 | 131.35 | low Tg acrylic |
| Joncryl 538 | 32.39 | high Tg acrylic |
| Glycol Ether DB | 19.63 | coalescing agent |
| Texanol | 4.64 | anti-blistering |
| Water | 12.00 | |

Example III F.

| Component | Weight | Function |
|---|---|---|
| Carboset XL-11 | 1898.1 | low Tg acrylic |
| Joncryl 538 | 468.0 | high Tg acrylic |
| DB Acetate | 266.4 | |
| Texanol | 66.6 | anti-blistering |
| Water | 294.9 | |

Although the invention has been described in detail with reference to certain preferred embodiments, variations and modifications exist within the scope and spirit of the invention as described and defined in the following claims.

I claim:

1. A water-based coating composition comprising a dispersion of a resin solids composition in water, said resin solids composition comprising (1) about 70 to about 99% by weight of an acrylic resin having a glass transition temperature of about 68° to about 150° F. said acrylic resin selected from carboxy-functional, hydroxy-functional and epoxy-functional acrylic resins and, (2) a reflow modifier selected from the group consisting of (a) and (b), wherein (a) is about 10 to about 30% by weight of a thermoplastic resin having a glass transition temperature of about 150° F. to about 250° F., and (b) is about 0.1 to about 12% by weight of a cross-linking agent for the acrylic resin wherein the cross-linking agent is melamine or a melamine formaldehyde condensation resin, provided that the amount of cross-linking agent is not more than 80% of the stoichiometric amount calculated based on the amount of acrylic resin, said coating composition further characterized by its capacity to provide a thermally reflowable high gloss coating having acceptable print resistance within a temperature range of about 140° to about 180° F.

2. The composition of claim 1 wherein the reflow modifier is a cross-linking agent employed in an amount not more than 50% of the stoichiometric amount calculated based on the amount of the acrylic resin.

* * * * *